United States Patent [19]
Sutton et al.

[11] 3,858,269
[45] Jan. 7, 1975

[54] TACKLESS CARPET STRIPPING

[75] Inventors: Lawrence R. Sutton, Detroit; Carl P. Ranno, Grosse Pointe Park; Kenneth E. Hewson, Farmington, all of Mich.

[73] Assignee: Performance Industries, Inc., Pontiac, Mich.

[22] Filed: Mar. 22, 1973

[21] Appl. No.: 343,649

Related U.S. Application Data
[63] Continuation-in-part of Ser. No. 271,376, July 13, 1972.

[52] U.S. Cl. ................................ 16/16, D8/270
[51] Int. Cl. ............................................. A47g 27/04
[58] Field of Search ............. 16/16, 4; 52/179, 273; 85/13; D8/266, 270

[56] References Cited
UNITED STATES PATENTS
| | | | |
|---|---|---|---|
| 2,599,580 | 6/1952 | Paterson et al. | 16/16 |
| 2,726,419 | 12/1955 | Saks et al. | 16/16 |
| 2,926,378 | 3/1960 | Eichhorn et al. | 16/4 |
| 3,528,693 | 9/1970 | Pearson et al. | 85/13 |

*Primary Examiner*—Paul R. Gilliam
*Assistant Examiner*—Kenneth J. Dorner
*Attorney, Agent, or Firm*—Basile and Weintraub

[57] ABSTRACT

A tackless carpet stripping for attaching carpet or the like to a floor in a room wherein the stripping is fastened to the floor along the peripherial edge of the floor adjacent the walls of the room. The tackless carpet stripping is a one-piece integrally molded structure having an elongated member with its lower surface positioned on the floor and fastened thereto by means of nails or the like. The upper surface of the elongated member has a plurality of integral sharp-ending holding members projecting toward the wall at an angle inclined with respect to the upper surface of the elongated member. In the preferred embodiment the stripping is fabricated from a plastic material, such as polystyrene.

5 Claims, 6 Drawing Figures

Patented Jan. 7, 1975

3,858,269

TACKLESS CARPET STRIPPING

CROSS REFERENCE TO RELATED PATENT APPLICATIONS

The present patent application is a continuation-in-part of co-pending U.S. Pat. application Ser. No. 271,376 filed July 13, 1972 for "Tackless Carpet Stripping" and is related in substance to the subject matter disclosed in co-pending U.S. Design Pat. application Ser. No. 271,377 filed July 13, 1972 for "Tackless Carpet Stripping."

BACKGROUND OF THE INVENTION

1. Field of the Invention

The present invention relates to a means for fastening carpeting or the like to a floor and, in particular, to tackless carpet stripping of the type that is fastened to a floor and has sharp upwardly projecting members that engage the undersurface of the carpeting and retain the same in position.

2. Description of the Prior Art

Heretofore, numerous fastening devices have been employed for attaching carpeting to a floor and tackless carpet stripping has become the most common type of fasteners employed for installing carpeting in both residential and commercial buildings. The conventional tackless carpet generally comprises a strip of wood approximately four feet in length, 1 inch in width and a quarter of an inch in thickness with the bottom surface of the tackless carpet stripping being positioned on the floor and fastened thereto by nails driven through the wooden strip and into the floor. The upper surface of the wooden strip is provided with a plurality of sharp-edged nails or spikes that are driven from the underside of the wooden strip and project above the outer side at an angle inclined with respect to the upper surface of the wooden strip such that the spikes project toward the wall adjacent the wooden strip when the same is positioned on the floor. Although such wooden tackless carpet stripping is well known, widely used and offers substantial advantages in the installation of carpeting over older methods, this type of wooden strip construction unnecessarily adds to the expense of carpet installation as several steps are required in the fabrication of the wooden tackless carpet stripping. In addition, during the installation of the carpeting and, in particular, when nails are driven through the wooden strips to attach the same to the floor, the strips tend to split or crack causing the carpet installer to replace the strip.

Therefore, it would be desirable to provide a new and improved tackless carpet stripping which is simple and inexpensive to fabricate and yet one which is durable and of high strength.

The only prior art, in addition to the aforementioned wooden strips, known to the inventors was cited in the aforementioned co-pending design patent application and the same does not anticipate the instant invention.

SUMMARY OF THE INVENTION

The present invention which will be described subsequently in greater detail comprises a tackless carpet stripping comprising an elongated member fabricated from synthetic material such as polystyrene and having a plurality of regularly spaced integrally formed projections extending upwardly from one surface thereof at an angle inclined with respect to said last-mentioned surface, said projecting members having sharp ends for engaging the underside of a carpet and retaining the same in position.

It is therefore an object of the present invention to provide a new and improved tackless carpet stripping fabricated from synthetic material and being of an integral one-piece construction.

It is also an object of the present invention to provide a new and improved tackless carpet stripping which is of a simpler and inexpensive design and which is of great strength and durability.

Other objects, advantages and applications of the present invention will become apparent to those skilled in the art of tackless carpet stripping when the accompanying description of several examples of the best modes contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which.

DESCRIPTION OF THE PREFERRED EMBODIMENT

Figure 1:
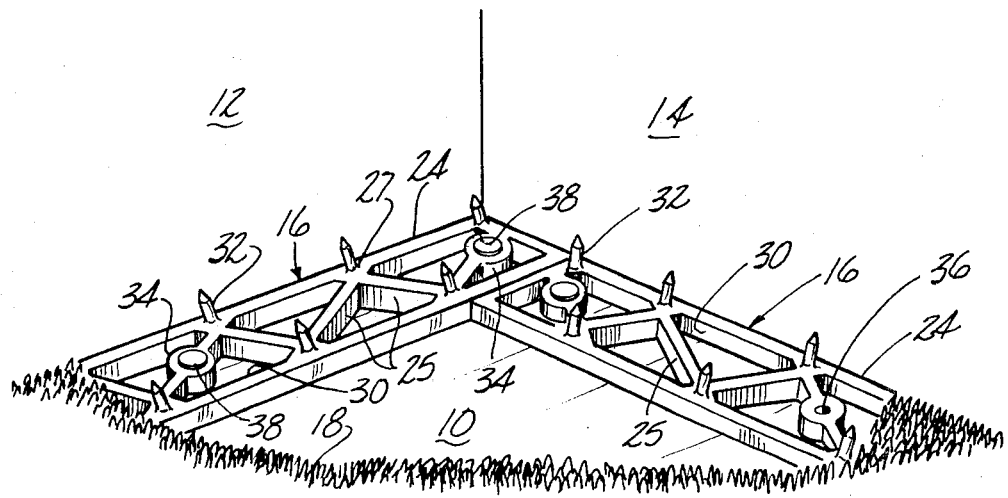
FIG. 1 is a fragmentary perspective view of a room having carpet installed by means of a tackless carpet stripping constructed in accordance with the principles of the present invention.

Referring now to the drawing, and in particular, FIG. 1 wherein there is illustrated a fragmentary perspective view of a corner of a room having a floor 10 and a pair of intersecting walls 12 and 14 which are disposed along the peripheral edge of a floor 10 in the conventional manner. A plurality of end-to-end aligned tackless carpet strippings 16 are illustrated as being fastened to the floor 10 along the peripheral edge thereof adjacent each of the walls 12 and 14. The tackless carpet strippings 16 are employed to fasten a carpet 18 to the floor 10. As is conventional in carpet installation, a floor padding (not shown) is disposed over the floor 10 and nailed thereto with any suitable fasteners, such as tacks and the like, with the peripheral edge of the padding terminating at the tackless carpet strippings 16, the padding being approximately the same thickness as the strippings 16. The carpeting 18 has a length and width corresponding to the floor area and is positioned in such a manner that the underside of the peripheral edges of the carpeting 18 is adapted to be engaged and retained in position by the tackless carpet stripping 16 in a well known manner and as will be described in greater detail hereinafter.

Figure 2:
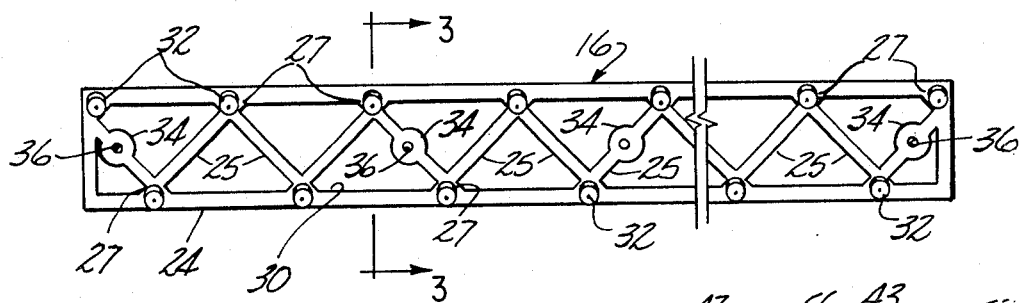
FIG. 2 is a top elevational view of the tackless carpet stripping illustrated in FIG. 1.
Figure 3:
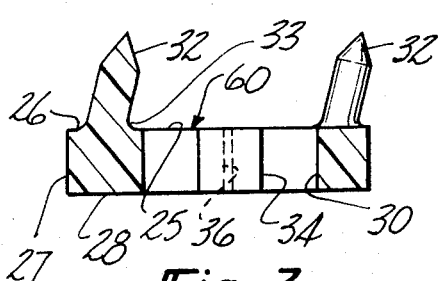
FIG. 3 is an enlarged cross-sectional view of the tackless carpet stripping taken along line 3—3 of FIG. 2.

Referring now to FIGS. 1, 2 and 3 wherein there is illustrated in greater detail a tackless carpet stripping 16 comprising an elongated rectangularly shaped base member 24 approximately 48 inches in length, 0.8 inches in width and a quarter of an inch in thickness. Alternately disposed diagonal cross members 25 are carried by the base member 24 with each adjacent pair of cross members intersecting at a juncture 27 which is integral with a side wall of the base member 24. The juncture point 27 on each side of the base member 24 is preferably spaced at 1 inch intervals with the juncture point 27 being alternately spaced on opposite sides of the base member 24 at ½ inch intervals. The base member 24 and the cross members 25 have upper surfaces 26 and lower surfaces 28 (FIG. 3), the latter surfaces 28 being adapted to be positioned on the floor 10 adjacent the walls 12 and 14, as aforementioned. Each adjacent pair of cross members 25 and that portion of the base member 24 thereinbetween define a generally triangularly shaped aperture 30 which extends from the upper surface 26 to the lower surface 28. The apex of each triangular aperture 30 along the length of the base member 24 terminates at the juncture points 27.

As can best be seen in FIG. 3, the base member 24 has a plurality of sharp-ended projections 32 extending outwardly from the upper surface 26 of the base member 24 and inclined with respect to the plane in which the upper surface 26 is disposed. The sharp-ended projections 32 are successively disposed on the opposite sides of the upper surface 26 at regularly spaced intervals, that is at the juncture points 27 and adjacent the apex of each triangularly shaped aperture 30. Thus each projection 32 is spaced approximately 1 inch from its adjacent projection 32 on the same side of the base member 24 while the projections 32 on one side of the base member 24 are approximately one-half inch from the projections 32 disposed along the opposite side of the base member 24.

The projections 32 are of a generally round shape extending approximately one-fourth of an inch above the upper surface 26, and tapered at their upper ends to form a very sharp point. The base 33 of each projection 32 is enlarged and provided with a rounded contour (FIG. 3) for added strength. In the preferred embodiment the projections 32 are inclined 15° with respect to the upper surface 26. Although the spacing of the projections 32 and the 15 degree angle of inclination may be varied, the aforementioned dimensional characteristics are preferred.

Enlarged cylindrical sections 34 (FIG. 3) are formed at the mid-section of selected cross members 25 at evenly spaced intervals along the entire length of the base member 24 and preferably one-half of an inch from the opposite ends of the base member 24 and at two inch intervals thereinbetween. The cylindrical sections 34 are approximately 0.300 inches in diameter with a central bore 36 having a 0.100 inch diameter through which a suitable nail 38 (FIG. 1) is driven in order to fasten the carpet stripping 16 to the floor 10 as will be described hereinafter. The enlarged cylindrical sections are integrally formed on the selected cross members 25.

The tackless carpet stripping 16, that is, the base member 24, the projections 32, the cylindrical sections 34, and the cross members 25 are preferably formed by an injection molding process resulting in an integral one-piece construction. In the preferred embodiment, the tackless carpet stripping 16 is fabricated from a polystyrene material. However, other similar materials may be employed, such as polyester, polyether, polyureas, and polyurethane. The material may be provided with a ground glass to add additional strength to the resulting product and, in particular, to the projections 32. The remaining embodiments of the present invention to be described hereinafter may be fabricated in the same manner.

In use the tackless carpet stripping 16 is positioned along the peripheral edge of the floor 10 adjacent the walls 12 and 14 as shown in FIG. 1, with the projections 32 pointing toward its associated wall such that when a carpet installer stretches the carpeting in a conventional manner and lays the peripheral edge of the carpeting 18 over the upper surface 26 of the base member 24, the sharp-edge projections 32 will engage and securely grasp the underside of the carpeting 18 and retain the carpeting in an installed position as is conventionally done with the aforementioned wooden strippings. Excess carpet extending over or beyond the strip 16 toward the wall is cut in the conventional manner. The apertures 30 and cross members 25 permit the tackless carpet stripping 16 to be easily broken and to provide shorter lengths of stripping where needed to accomodate varying lengths of walls along which the carpeting 18 is being installed. When the tackless carpet stripping 16 is positioned along the peripheral edge of the floor adjacent the walls 12 and 14, the strippings 16 are fastened to the floor 10 by any suitable means, such as the aforementioned nails 38 or tacks, which are driven through the cross member cylindrical section bores 36 and into the floor 10.

Figure 5:
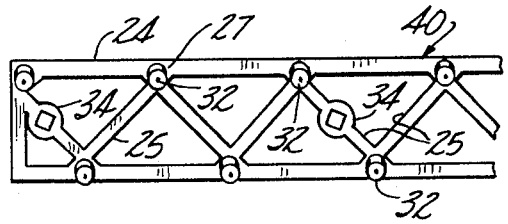
FIG. 5 is a top elevational view of a third example of the present invention in the form of a tackless carpet stripping.

In the event a carpet stripping is to be employed in installing the carpeting 18 on a concrete floor, a tackless carpet stripping 40 of the type disclosed in FIG. 5 may be used. The carpet stripping 40 is similar in design and method of fabrication as aforementioned in the description of the carpet stripping 16 in that the carpet stripping 40 comprises the base member 24, the cross member 25, the projections 32 and the enlarged cylindrical sections 34. The stripping 40 differs in that the enlarged cylindrical sections 34 are provided with enlarged square shaped apertures or bores 42 which facilitate the passage of a concrete engaging nail (not shown) having a shank with a square cross section.

Figure 4:
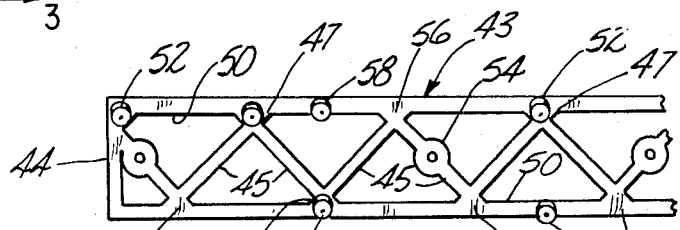
FIG. 4 is a top elevational view of a second example of the present invention in the form of a tackless carpet stripping.

Referring now to FIG. 4 for a description of a third example of the present invention in the form of a carpet stripping 43 comprising an elongated rectangularly shaped base member 44 approximately 48 inches in length, 0.8 inches in width and a quarter of an inch in thickness. Alternately disposed diagonal cross members 45 are carried by the base member 44 with each adjacent pair of cross members intersecting at a juncture 47 which is integral with a side wall of the base member 44. The juncture point 47 on each side of the base member 44 is preferably spaced at 1 inch intervals with the juncture points 47 being alternately spaced on opposite side of the base member 44 at ½ inch intervals. The base member 44 and the cross members 45 have upper surfaces and lower surfaces, the latter of which is adapted to be positioned on the floor in the same manner as the stripping 16, as aforementioned. Each adjacent pair of cross members 45 and that portion of the base member 44 thereinbetween define a generally triangularly shaped aperture 50 which extends from the upper surface to the lower surface of the base member 44. The apex of each triangular aperture 50 along the base member 44 terminates at juncture points 47.

The base member 44 has a plurality of sharp-ended projections 52 extending outwardly from the upper surface of the base member 44 and inclined with respect to the plane in which the upper surface is disposed. The sharp-ended projections 52 are generally disposed on the opposite sides of the upper surface of the base member 44 at regularly spaced intervals, that is, at the juncture points 47 and adjacent the apex of each triangularly shaped aperture 50. The stripping 43 differs from the aforementioned stripping 16 in that the regular spacing between the projections 52 is broken at selected locations along the length of the base member 44 for a purpose to be described hereinafter.

The projections 52 are of a generally round shape extending approximately one-fourth inch above the upper surface, and tapered at their upper ends to form a very sharp point. In the preferred embodiment the projections 42 are inclined 15° with respect to the upper surface of the base member 44.

Enlarged cylindrical sections 54 are formed at the mid-section of selected cross members 45 at evenly spaced intervals along the entire length of the base member 44 and may be as described with respect to the aforementioned stripping 16.

The cross member juncture points designated by the numeral 56 and located at the opposite ends of those cross members which have the enlarged cylindrical section 54 thereon are not provided with the projections 52 as is the case with the stripping 16 illustrated in FIG. 2. Instead, projections 58 are provided at laterally spaced locations, preferably on the base member 44 midway between the juncture points 47 and 56. The repositioning of the projections 58 removes the same from the vicinity of the cylindrical sections 54 whereby the possibility of the breakage of a projection from the impart of a hammer used to drive a nail through the cylindrical sections 54 is eliminated. At the same time the stripping 43 has on its total lenth substantially the same number of projections as carried by the stripping 16, and thus is as strong.

Figure 6:
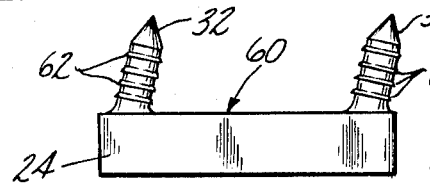
FIG. 6 is a side elevational view of a fourth example of the present invention in the form of a tackless carpet stripping.

Referring now to FIG. 6 wherein there is illustrated a fourth example of the present invention in the form of a tackless carpet stripping 60 having substantially the same construction and design as the stripping 16 or alternately the stripping 40 or 43 and a further description of these components is not necessary. In the embodiment illustrated in FIG. 6, the sharp-ended projections 32 are provided by a plurality of shoulder protuberances 62. The shoulders 62 are equally spaced along the length of the projections 32. The shoulders 62 are integral with the material forming the projections 32 and extend circumferentially around the shank of the projection 32. The shoulders 62 engage the carpeting 18 and function to restrain the carpeting from accidentally disengaging from the stripping 60.

It can thus be seen that the present invention has provided a new and improved tackless carpet stripping which has all of the advantages of existing carpet strippings but, in addition, it is much less expensive to manufacture, easier to use and more durable in its construction and longer lasting in life.

Although only four embodiments of the present invention have been disclosed, it should be understood by those skilled in the art of tackless carpet stripping that other forms may be had all coming with the spirit of the invention and the scope of the appended claims.

What is claimed is as follows.

1. A tackless carpet stripping for attaching carpeting to a floor in a room wherein the stripping is fastened to the floor along the peripheral edges thereof and adjacent the walls of said room, said stripping comprising:

a one piece molded plastic elongated member of a predetermined length, a lower surface thereof being positioned on said floor along said peripheral edge, said member having longitudinal side walls connected by a plurality of cross members, said cross members being inclined with respect to the longitudinal axis of said stripping and adjacent pairs of cross members define an aperture thereinbetween; a selected number of said cross members having enlarged sections formed at the midsection of said cross members at evenly spaced intervals along with the entire length of said elongated member, said sections each having a bore through which a fastening means extends for fastening said elongated member to said floor; and a plurality of longitudinally spaced, sharp-ended, inclined holding members carried on the upper surface of said elongated member and projecting therefrom at an angle inclined with respect to said upper surface, said holding members projecting toward said adjacent wall when said stripping is fastened to said floor, said holding members being formed as one-piece projections of said elongated member and adapted to engage said carpeting, said holding members being regularly spaced along the upper surface of said elongated member and successively positioned on opposite sides of said upper surface along the length thereof, said elongated member being constructed such that said elongated members may be easily broken to provide shorter lengths thereof.

2. The tackless carpet stripping as defined in claim 1 wherein said elongated member and said holding members of said elongated member are fabricated from a material selected from the group consisting of polyurethane, polyethylene, polyester, polyether, polyureas and polystyrene.

3. The tackless carpet stripping defined in claim 1 wherein said bore is non-circular in cross section.

4. The tackless carpet stripping defined in claim 1 wherein said holding members have a plurality of circumferentially disposed protuberances for engaging said carpeting.

5. The tackless carpet stripping defined in claim 1 wherein said holding members project from said upper surface at an angle of 15° with respect to said upper surface.

* * * * *